US010112723B2

(12) United States Patent
Rossotto et al.

(10) Patent No.: US 10,112,723 B2
(45) Date of Patent: Oct. 30, 2018

(54) METHOD AND A DEVICE FOR STOPPING A TURBOSHAFT ENGINE IN NOMINAL OPERATION (71) Applicant: AIRBUS HELICOPTERS, Marignane (FR)

(72) Inventors: Regis Rossotto, Marseilles (FR); Jean-Francois Piccone, Cabries (FR)

(73) Assignee: Airbus Helicopters, Marignane (FR)

( * ) Notice: Subject to any disclaimer, the term of this patent is extended or adjusted under 35 U.S.C. 154(b) by 282 days.

(21) Appl. No.: 15/083,533

(22) Filed: Mar. 29, 2016

(65) Prior Publication Data

US 2016/0311547 A1 Oct. 27, 2016

(30) Foreign Application Priority Data

Mar. 31, 2015 (FR) ...................... 15 00643

(51) Int. Cl.
*B64D 31/06* (2006.01)
*F01D 21/00* (2006.01)
*F02C 9/00* (2006.01)
*B64C 27/46* (2006.01)
*F02C 3/10* (2006.01)
*F02C 9/26* (2006.01)

(52) U.S. Cl.
CPC .............. *B64D 31/06* (2013.01); *B64C 27/46* (2013.01); *F01D 21/00* (2013.01); *F02C 3/10* (2013.01); *F02C 9/00* (2013.01); *F02C 9/263* (2013.01); *F05D 2220/329* (2013.01); *Y02T 50/671* (2013.01)

(58) Field of Classification Search
CPC ......... B64C 27/46; B64D 31/06; F01D 21/00; F01D 21/02
See application file for complete search history.

(56) References Cited

U.S. PATENT DOCUMENTS 2,961,130 A * 11/1960 Adams ................... B64D 37/16
222/189.08
3,691,759 A * 9/1972 Scheerer ................... F02C 7/26
60/39.091
3,869,862 A 3/1975 Dickey
(Continued)

FOREIGN PATENT DOCUMENTS

EP 0091744 10/1983
EP 1978214 10/2008
(Continued)

OTHER PUBLICATIONS

French Search Report for French Application No. FR 1500643, Completed by the French Patent Office dated Jan. 21, 2016, 6 Pages.

*Primary Examiner* — Magdalena Topolski
(74) *Attorney, Agent, or Firm* — Brooks Kushman P.C.

(57) ABSTRACT

A method of stopping a turboshaft engine in flight. During a power reduction step, a current power of the engine for stopping is reduced to reach zero power, and a current speed of rotation of the gas generator of the engine for stopping is reduced to reach a predetermined intermediate speed when the current power becomes zero. During a temperature stabilization step, the current speed of rotation remains equal to the intermediate speed. During a shutdown step, the current speed of rotation is reduced to reach zero speed.

14 Claims, 3 Drawing Sheets (56) References Cited

U.S. PATENT DOCUMENTS

| | | | |
|---|---|---|---|
| 3,963,372 A | 6/1976 | McLain et al. | |
| 4,479,619 A | 10/1984 | Saunders et al. | |
| 4,738,098 A | 4/1988 | McMahon | |
| 5,163,638 A * | 11/1992 | Chaneac | B64C 27/82 244/17.19 |
| 5,403,155 A | 4/1995 | Head et al. | |
| 6,321,525 B1 * | 11/2001 | Rogers | F01D 17/06 60/39.281 |
| 2013/0219905 A1 | 8/2013 | Marconi et al. | |
| 2014/0020396 A1 * | 1/2014 | Corpron | B64D 31/00 60/772 |
| 2014/0333126 A1 * | 11/2014 | Vyas | B60R 16/03 307/9.1 |
| 2015/0125258 A1 | 5/2015 | Certain | |
| 2016/0090187 A1 * | 3/2016 | Certain | B64D 27/10 60/773 |
| 2016/0237917 A1 * | 8/2016 | Marconi | F02C 6/206 |
| 2017/0122221 A1 * | 5/2017 | Marconi | F02C 9/16 |

FOREIGN PATENT DOCUMENTS

| | | |
|---|---|---|
| EP | 1978214 | 4/2011 |
| EP | 2636596 | 9/2013 |
| EP | 2735508 | 5/2014 |
| FR | 2602270 | 2/1988 |
| FR | 2967132 | 5/2012 |
| FR | 2967133 | 5/2012 |
| WO | 2012059671 | 5/2012 |

\* cited by examiner

METHOD AND A DEVICE FOR STOPPING A TURBOSHAFT ENGINE IN NOMINAL OPERATION

CROSS REFERENCE TO RELATED APPLICATION

This application claims priority to French patent application No. FR 15 00643 filed on Mar. 31, 2015, the disclosure of which is incorporated in its entirety by reference herein.

BACKGROUND OF THE INVENTION (1) Field of the Invention

The present invention relates to a method and to a device for stopping a turboshaft engine in nominal operation.

(2) Description of Related Art

A vehicle, and in particular an aircraft, may be provided with a plurality of engines.

Certain rotorcraft are thus provided with a plurality of engines for driving at least one rotor providing lift and possibly also propulsion. For example, the Super-Frelon helicopter possesses three turboshaft engines.

Conventionally, a turboshaft engine comprises a gas generator having at least one compressor, a combustion chamber, and a high pressure expansion assembly connected to the compressor.

The compressor may have a plurality of compression stages that may be axial and/or centrifugal. Likewise, the expansion assembly may comprise a plurality of expansion turbines.

In addition, the engine has at least one low pressure working turbine that may be free or else linked to the gas generator.

The operation of the engine is controlled by a management system. For example, one known management system is a full authority digital engine control (FADEC) system. A management system usually comprises a computer connected to various sensors and to a fuel metering unit. The fuel metering unit then enables the management system to control the rate at which fuel is fed to the engine.

The management system is conventionally connected to a selector that is referred to for convenience as the "control selector". For example, the control selector may have three positions.

When the control selector is in a first position, e.g. referred to as its "STOP position", the engine is stopped.

When the control selector is in a second position, e.g. a "FLIGHT position", the engine is in operation.

The term "nominal operation" is used below to cover operation of the engine while the control selector is in the FLIGHT position. The engine can then operate while running at a variety of distinct operating ratings.

Finally, the control selector has an intermediate position, e.g. an "IDLE position". When the control selector is in this IDLE position, the engine operates at an idling speed. Idling is used on the ground or in flight to reduce the power developed by the engine.

In order to stop an engine in nominal operation, a person may move the control selector from the FLIGHT position to the STOP position.

When the control selector is put into the STOP position, the management system closes the fuel metering unit to stop feeding fuel to the engine. The engine is then stopped quickly. The power developed by the engine decreases at a steep gradient, of the order of 20 percent of the current power per second.

The loss of power resulting from stopping an engine in flight gives rise to jolts, in particular causing the aircraft to perform yaw movements. These jolts are felt by the crew and the passengers of the aircraft. Such jolts are necessarily unwelcome, at least from a sensory point of view.

On the ground, the situation is different.

Firstly, the power developed by the engine while on the ground is generally low during nominal operation. The drop in power then has limited impact on the aircraft.

Secondly, any jolt tending to cause the aircraft to perform a yaw movement is limited by friction between the landing gear of the aircraft and the ground.

Furthermore, directly stopping the engine as required by moving the control selector from the FLIGHT position to the STOP position can, in the long run, lead to fuel coking in the engine. This coking phenomenon relates to the fuel being transformed into a solid that can lead to malfunctioning of the engine. In the long run, and by way of example, the solidified fuel may plug injectors, prevent the engine from starting, lead to a loss of power from the engine, or indeed cause the engine to stop when no stop command has been given.

In order to avoid this coking phenomenon, a pilot may begin by moving the control selector to the IDLE position and keep the engine in the IDLE position for a certain length of time, prior to putting the control selector into the STOP position. Spending time idling seeks to stabilize the temperature in the combustion chamber of the engine at a low temperature prior to complete shutting down of the engine.

Document U.S. Pat. No. 4,738,098 gives teaching of this type.

When performed in flight, such a procedure considerably increases the workload on a pilot. Furthermore, passing to idling speed can also give rise to disagreeable yaw movements since the decrease in power from the engine is sudden, just as it is for a stop required by using the STOP position of the selector. Furthermore, the procedure may be accompanied by the need to reduce the collective pitch of the blades of a rotor on a rotorcraft. Such a step then makes the procedure more complicated.

In the technological background, Document U.S. Pat. No. 4,479,619 proposes a power transmission system for three-engined helicopters.

Document U.S. Pat. No. 3,963,372 proposes a solution for managing power and for controlling the engines in three-engined helicopters. Document WO 2012/059671A2 proposes two engines having maximum powers that are not equal.

Document EP 0 091 744 appears to describe an aircraft having three identical engines. According to its description, the three engines can operate simultaneously. Nevertheless, the third engine may be shutdown in cruising flight. When all three engines are in use, a failure of the third engine is compensated by an increase in power from the main engines.

Documents EP 2 735 508, EP 1 978 214, EP 2 636 596, U.S. Pat. No. 5,403,155, and U.S. Pat. No. 3,869,862 are also known.

BRIEF SUMMARY OF THE INVENTION

An object of the present invention is thus to propose an automatic method of stopping a turboshaft engine on request of a pilot or of an autopilot system.

The invention thus relates to a method of stopping a turboshaft engine in flight on a multi-engined aircraft, the engine developing power referred to as the "current power" at each instant, the engine comprising a gas generator having at least one member presenting, at each instant, rotation referred to as the "current speed of rotation".

The method comprises a step of generating an order to generate an order referred to as a "stop order" ordering stopping of an engine referred to as the "engine for stopping", the method performing automatically and in succession for the engine for stopping the following steps when the stop order is generated:

a power reduction step comprising the stages of:
reducing said current power so as to reach zero power, said current power decreasing at a predetermined variation rate referred to as the "power variation rate";
reducing said current speed of rotation so that the current speed of rotation reaches a predetermined intermediate speed when said current power becomes zero;

a temperature stabilization step during which the current speed of rotation remains equal to the intermediate speed; and a shutdown step during which said current speed of rotation is reduced to reach zero speed.

In this method, an engine can be stopped in flight automatically in a manner that is transparent for a pilot.

In this method, an order is generated for the purpose of completely stopping an engine. The stop order therefore does not require the engine to be caused to idle but does indeed cause the engine to stop.

The stop order may be generated by a pilot using a selector having an "in-flight stop" position. In a variant, the stop order is generated by an autopilot system while the aircraft is performing a stage of flight that allows for an engine to be stopped in flight. A manufacturer can thus perform tests and/or simulations to evaluate the conditions in which it is possible to stop an engine in flight.

The present invention thus consists in stopping the engine "gently", i.e. at a controlled rate, firstly to avoid generating yaw movements and secondly to avoid the phenomenon of fuel coking.

During the power reduction step, the power from the engine is reduced by varying power at a rate that is limited. The power developed by the engine decreases at a gradient that is relatively shallow or even very shallow, which tends to limit any risk of generating yaw jolts.

The power developed by the engine for stopping is reduced until it reaches zero power.

At the same time, the speed of rotation of the gas generator is reduced to an intermediate speed.

For example, the management system of the engine for stopping controls the fuel metering system of that engine for stopping so as to reduce the fuel flow rate in appropriate manner. For example, the management system applies a relationship or uses a database in order to determine the position to be reached by the fuel metering unit so as to reduce the current power and the current speed of rotation of the engine in the required manner.

At the end of the power reduction step, the power developed by the engine for stopping is zero. Furthermore, the current speed of rotation of the gas generator has reached the intermediate speed.

The temperature stabilization step then begins. During this temperature stabilization step, the current speed of rotation of the gas generator is automatically maintained at the intermediate speed in order to enable the temperature in the gas generator to stabilize so as to avoid the coking phenomenon.

Once the temperature stabilizing speed has been reached, the engine for stopping is therefore maintained at this speed for the length of time needed to establish a stable temperature in the engine.

During the temperature stabilization step, the power developed by the engine continues to be zero. The engine for stopping is no longer delivering any torque to the moving assemblies that are connected to the engine for stopping.

The temperature stabilization step can come to an end after a predetermined duration, or when the temperature of the engine ceases to vary, for example. By way of illustration, a temperature is measured downstream from the gas generator and the end of the temperature stabilization step depends on that temperature measurement.

When the engine for stopping is at a stable temperature, the control system automatically implements final stopping of the engine by switching off the fuel metering unit during the shutdown step or by directly switching off the feed of fuel.

The current speed of rotation of the gas generator is reduced to zero speed. The speed of rotation of the gas generator may decrease more quickly during the shutdown step than during the power reduction step since the engine is no longer delivering any power during the shutdown step. A rapid reduction in the speed of rotation of the gas generator then has only limited impact on the overall operation of the aircraft.

The method is thus an automatic method enabling an engine to be shutdown in flight while limiting any risks of encountering disagreeable yaw movements and/or a coking phenomenon.

Furthermore, the method is entirely automatic. The workload on the pilot is thus reduced.

The method may also include one or more of the following characteristics.

By way of example, the aircraft has a given number of engines and an anticipator generating a power anticipation order for controlling the engines as a function of a piloting order transmitted to a control member controlling a path followed by an aircraft, the power reduction step including an anticipation stage during which the anticipation order transmitted to each non-stopped engine is increased by applying a predetermined variation rate referred to as the "anticipation variation rate", the anticipation variation rate being a function of the power variation rate. For example, the anticipation variation rate is equal to the quotient of the power variation rate divided by the given number of engines minus one.

Thus, an aircraft may include an anticipator that generates an order seeking to anticipate the power that needs to be developed by an engine as a function of a piloting order given to a piloting member by the pilot or by an autopilot. The term "control member controlling a path" designates any aerodynamic means enabling an aircraft to be controlled, such as a blade of a lift rotor, for example.

By way of example, an anticipator may comprise a potentiometer actuated by a collective pitch control that controls the collective pitch of the blades of a lift and propulsion rotor. The potentiometer produces an order in the form of an electrical signal that varies as a function of the position of the collective pitch control. This order is transmitted to the management system of the engines for processing.

Under such circumstances, this implementation consists in modifying the anticipation order that is given, where the anticipation order represents a power to be reached. The anticipation order is increased to compensate for the reduction in power that results from stopping an engine.

For example, an aircraft may have three engines. The method is applied to stop one engine in flight. During the power reduction step, the power developed by the engine for stopping is reduced by applying a power variation rate that is equal to 20 kilowatts per second, for example.

Under such circumstances, the power anticipation order transmitted to each engine that remains in operation is, on the contrary, increased at an anticipation variation rate that is equal to the power variation rate divided by the number of engines that are to remain in operation, i.e. the total number of engines minus one, giving:

$$tx'=tx/(nbr-1)$$

where "tx'" is the anticipation variation rate, "tx" represents the power variation rate of 20 kilowatts per second, "nbr" represents the number of engines in the power plant, which number nbr is equal to three in this example, and "/" represents the division sign.

The anticipation variation rate may then increase by 10 kilowatts per second.

In parallel, the aircraft increases the power anticipation value transmitted to the management systems of the engines that are not stopped. This increase serves to anticipate the reduction in power resulting from stopping the engine for stopping. The loss of power for the aircraft as a whole is thus minimized or even zero. Consequently, people present in the aircraft do not feel the decrease in the power developed by the engine for stopping.

In another aspect, said power variation rate lies in the range 1 percent to 15 percent of a reference power per second, for example. The power variation rate is then expressed in watts per second.

For example, the reference power corresponds to the maximum takeoff power under standardized conditions known as the international standard atmosphere (ISA) and sea level (SL). Furthermore, the power variation rate may be determined as a function of a stage of flight of the aircraft.

When the engine develops a high level of power, the power variation rate may be small in order to limit any risk of troublesome jolts appearing.

Conversely, when the engine is developing little power, the power variation rate may be high.

In particular, the power variation rate is determined as a function of at least one of the following parameters: a piloting parameter of the aircraft relating to a parameter controlled by a pilot using flight controls; a flight parameter relating to flight conditions of the aircraft; one or more engine parameters relating to the operation of the engine for stopping; and information indicating whether the aircraft is carrying passengers.

For example, if the aircraft is performing a "technical" flight, then the aircraft is not carrying any passengers. The aircraft is transporting only the crew who are prepared for the consequences of stopping an engine in flight, and thus for any jolts that might result from such stopping of an engine. Consequently, the slow and gentle deceleration of the engine is not absolutely necessary. The deceleration may therefore be fast, while still being bounded by a deceleration limit to avoid the engine being shutdown during the speed reduction step.

By way of example, each piloting parameter is to be selected from a list comprising at least: information about the collective pitch of the blades of a lift rotor of the aircraft; and information relating to the pitch of the blades of a yaw movement control rotor of the aircraft.

Specifically, a rotorcraft may have a rotor referred to as the "main" rotor that provides the aircraft with at least some of its lift, and possibly also with its propulsion. Furthermore, the rotorcraft may have a rotor sometimes referred to as the "tail" rotor or the "anti-torque" rotor that serves to control movement in yaw of the aircraft.

The aircraft then has controls enabling the collective pitch and the cyclic pitch of the blades of the main rotor to be controlled. For example, the aircraft may have a cyclic pitch stick for controlling the cyclic pitch and a collective pitch lever for controlling the collective pitch of the blades of the main rotor.

Furthermore, the aircraft has controls enabling the collective pitch of the blades of the tail rotor to be controlled, such as pedals, for example.

If the flight controls are requiring a high collective pitch position, then the aircraft is in a stage of flight requiring a large amount of power from the engines. A sudden stop of an engine would be felt strongly by the crew and passengers. Under such circumstances, the deceleration of the engine is slow, with the power variation rate being small.

Conversely, if the flight controls are requiring a low collective pitch position, e.g. while descending rapidly, then the engine can be stopped rapidly since the power being required of the engine during such stages of flight is generally low or even zero. It is then difficult for a pilot or a passenger to sense that an engine is being stopped.

Furthermore, each flight parameter is optionally to be selected from a list comprising at least: a speed of the aircraft; an altitude of the aircraft; a temperature outside the aircraft; a speed of rotation of a lift rotor of the aircraft; and a weight of the aircraft.

As a function of these parameters, a manufacturer knows how to determine whether the aircraft is in a stage of flight that requires a large amount of power or a small amount of power from the engine.

For example, an aircraft presenting weight that is low compared with its maximum weight requires less power for a given stage of flight than is required by the same aircraft that is loaded up to its maximum weight. As a result, for a given stage of flight, the stopping of an engine needs to be performed with a power variation rate that is smaller in an aircraft presenting heavy weight than in an aircraft presenting little weight.

Likewise, the speed of advance of the aircraft is a parameter that has a direct influence on the power that needs to be developed by its power plant. The flight envelope can thus be virtually subdivided as a function of the power required given the speed of advance of the aircraft so as to match the deceleration to be applied to the engine with each portion of the flight envelope.

Furthermore, each engine parameter is to be selected from a list comprising at least: a temperature of the engine for stopping; a torque of the engine for stopping; and the speed of rotation of the engine for stopping.

The engine parameters serve to characterize the power delivered by the engine.

Furthermore, at least one booster pump of the engine for stopping may be switched off when the current speed of rotation of the engine for stopping is zero.

A booster pump may be used to transfer fuel to an engine. It is then possible to envisage automatically switching off the booster pump of an engine in order to completely finish off stopping the engine.

Furthermore, for an aircraft that has at least one engine provided with a dynamic air inlet facing towards a front end of the aircraft, it is preferably this engine that is stopped.

By way of example, the pilot may preferably choose to shutdown an engine having a dynamic air inlet, i.e. an air inlet that is fed with air under the effect of the advance of the aircraft. Such a dynamic air inlet faces towards the front end of the aircraft.

Thus, the engine that has been stopped is capable of restarting more quickly compared with an engine having a static air inlet, since the incoming air presents a certain amount of pressure and a certain speed on entering the engine during forward flight.

Furthermore, the stop order may optionally be taken into account in the situation where the aircraft is flying at an altitude greater than an altitude threshold.

In this implementation, the engine is stopped only at high altitude, e.g. higher than 1500 feet so that the pilot has sufficient time available to restart the engine before the aircraft reaches the ground.

In addition to a method, the invention provides a stop device for stopping a turboshaft engine.

Such a stop device may include control means for requiring the engine to stop, the control means being connected to a processor unit that applies the method of the invention.

The invention also provides an aircraft having a plurality of turboshaft engines, the aircraft including such a stop device for at least one engine.

BRIEF DESCRIPTION OF THE SEVERAL VIEWS OF THE DRAWINGS

The invention and its advantages appear in greater detail from the context of the following description of implementations given by way of illustration and with reference to the accompanying figures, in which.

Elements that are present in more than one of the figures are given the same references in each of them.

DETAILED DESCRIPTION OF THE INVENTION

Figure 1:
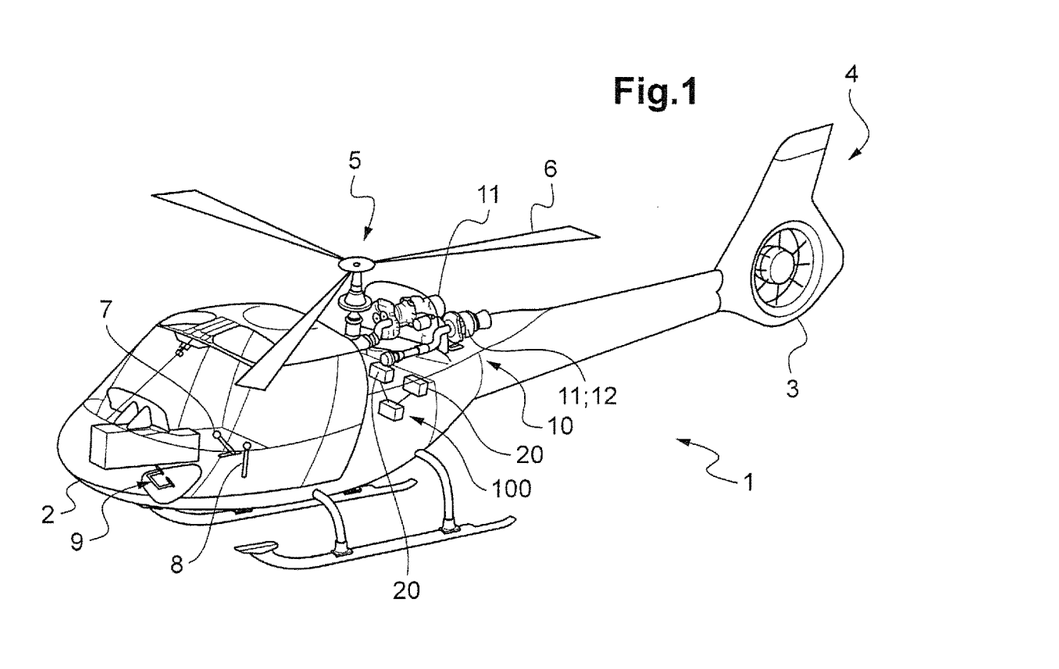
FIG. 1 shows an aircraft of the invention.

FIG. 1 shows an aircraft 1 of the invention.

The aircraft comprises a structure that extends longitudinally from a front end 2 to a rear end 3.

Furthermore, the aircraft is a rotorcraft having a main rotor 5 with blades 6 for providing the aircraft with at least some of its lift and possibly also its propulsion. The collective pitch and the cyclic pitch of the blades of the main rotor 5 can be controlled respectively by a collective pitch lever 7 and by a cyclic pitch stick 8. An autopilot system may also control the collective pitch and the cyclic pitch of the blades of the main rotor.

The aircraft 1 also has a yaw movement control rotor 4 for controlling the yaw movement of the aircraft. The collective pitch of the blades of this yaw movement control rotor 4 can be controlled by pedals 9 and/or by an autopilot system.

In order to drive the various rotors, the aircraft has a power plant 10. The power plant has a plurality of turboshaft engines 11. In particular, the power plant has a number of engines referred to below as the "given number nbr".

By way of example, each engine drives the main rotor 5 via a main power transmission gearbox.

Figure 2:
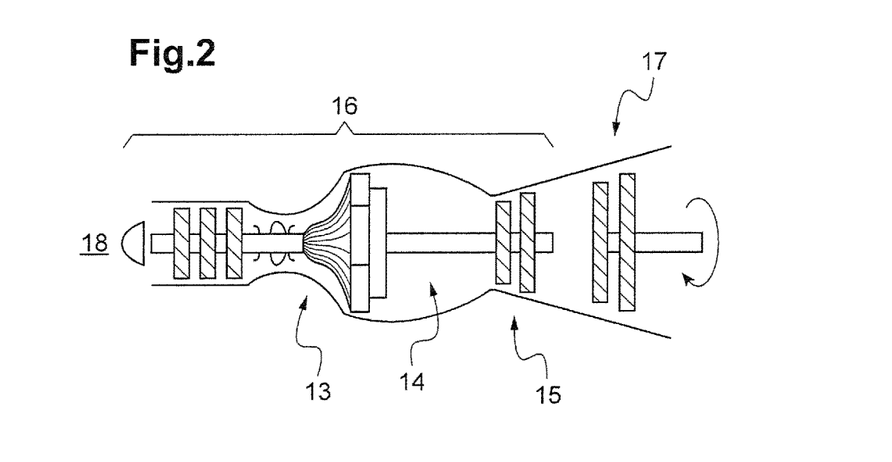
FIG. 2 is a diagram of a turboshaft engine.

With reference to FIG. 2, a turboshaft engine conventionally comprises an air inlet, such as an air inlet that may be of dynamic type 18 in order to feed a gas generator 16 with air.

The gas generator 16 includes a compressor 13 having one or more turbines for compressing the air coming from the air inlet 18.

The compressed air is then taken to a combustion chamber 14 of the gas generator 16. The hot gas leaving the combustion chamber 14 expands and drives rotation of an expansion assembly 15 having at least one high pressure turbine.

The compressor 13 and the expansion assembly 15 are set into rotation at a speed of rotation Ng.

Furthermore, the engine has at least one low pressure turbine 17 downstream from the gas generator. The low pressure turbine then serves to drive an outlet shaft of the engine for the purpose of driving rotation of the rotors of the aircraft, if any through a gearbox.

Figure 3:
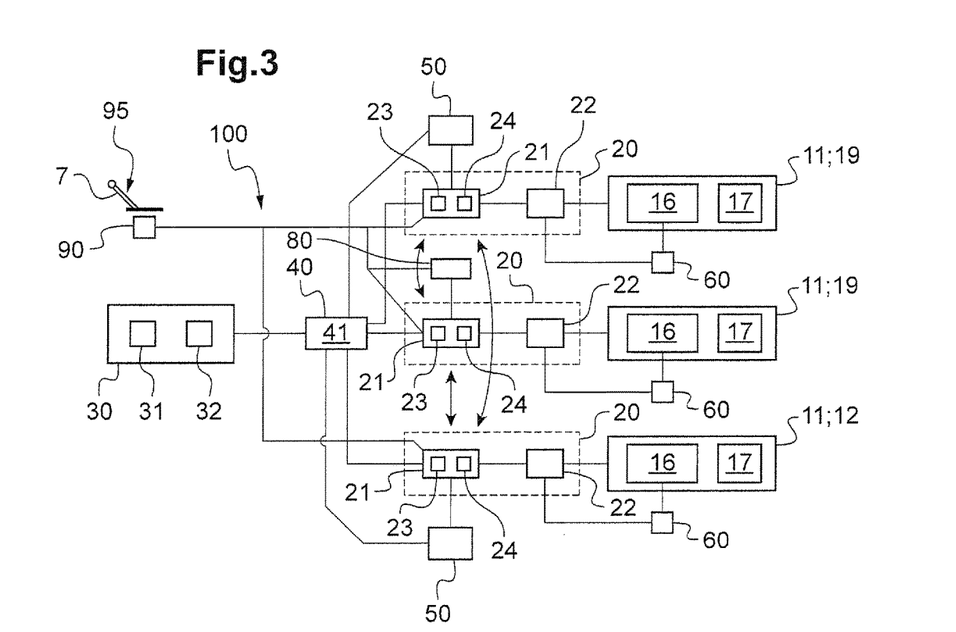
FIG. 3 is a diagram showing a first variant of the invention.

With reference to FIG. 3, each engine may co-operate with a respective booster pump 60. A booster pump transfers fuel from a tank to the engine. Each engine may also include a suction pump.

Furthermore, each engine is controlled by a respective management system 20. The management systems can communicate with one another.

By way of example, each management system 20 is provided with an electronic computer 21. Such an electronic computer 21 may be provided with at least one processor or the equivalent for executing information stored in a storage space 24.

Furthermore, the management system includes a fuel metering unit 22 controlled in particular by the electronic computer 21. In a degraded mode it is also possible for the fuel metering unit to be controlled mechanically.

Each management system is also connected to a set of measurement systems 50.

Such measurement systems 50 may include sensors for determining information relating to a piloting parameter.

The term "sensor" should be understood broadly, making reference either to a sensor as such, or else to a system that makes it possible to determine the value of a parameter.

In particular, the sensors may measure information about the collective pitch of the blades of the main rotor 5 by means of the position of a member in a control channel for controlling collective pitch, for example. Likewise, sensors may measure information relating to the pitch of the blades of the yaw movement control rotor 4 of the aircraft 1.

By way of example, these sensors may determine the positions of members controlling the pitches in question.

These measurement systems 50 may include sensors for determining information about a flight parameter. In particular, sensors may measure a speed of the aircraft 1, e.g. such as the air speed of the aircraft. By way of example, it is possible to use an airspeed indicator system.

Sensors may also measure an altitude of the aircraft using an ambient pressure sensor or a radioaltimeter, for example, and a temperature outside the aircraft using a thermometer, or indeed the speed at which the lift rotor 5 of the aircraft is being driven in rotation.

The weight of the aircraft may also be evaluated, e.g. using information concerning takeoff weight and information concerning the weight of fuel that has been consumed.

The measurement systems 50 may include sensors for determining the value of at least one engine parameter of a turboshaft engine. Such an engine parameter may be selected from a list comprising at least: a temperature of the engine, such as a temperature downstream from the gas generator; a torque developed by the engine; the speed of rotation of the gas generator of the engine that is to be stopped; the speed of rotation of the free turbine; and the fuel consumption. The term "speed of rotation" is used below to refer to the speed of rotation of the gas generator of an engine.

Furthermore, each management system may be connected to an anticipator 90. The anticipator 90 communicates information to the management systems concerning the power that is to be developed by each engine.

The anticipator 90 may comprise a potentiometer operated by a flight control 95, such as a collective pitch lever 7, for example.

In addition, the aircraft 1 has a device referred to as a "stop device" 100 for stopping an engine 11 in flight, referred to as the "engine for stopping" 12.

The stop device includes control means 30 for requesting stopping of the engine for stopping 12.

The control means 30 may include a member 31 that is operable by a person, or indeed an autopilot system 32.

The control means 30 then communicate with a processor unit 40.

In addition, the stop device may include parameter-setting means for operating by a pilot to indicate whether passengers are present in the aircraft. This information is stored in order to be accessible to the processor unit.

In the embodiment of FIG. 3, the processor unit 40 includes a unit referred to as a "dedicated unit" 41. By way of example, the processor unit 40 then includes a processor or the equivalent for executing instructions stored in a storage space in order to apply the method of the invention.

The processor unit may then be connected to the measurement systems 50, and indeed to the anticipator 90. Furthermore, the processor unit 40 is connected to each management system, and indeed to each booster pump.

Figure 4:
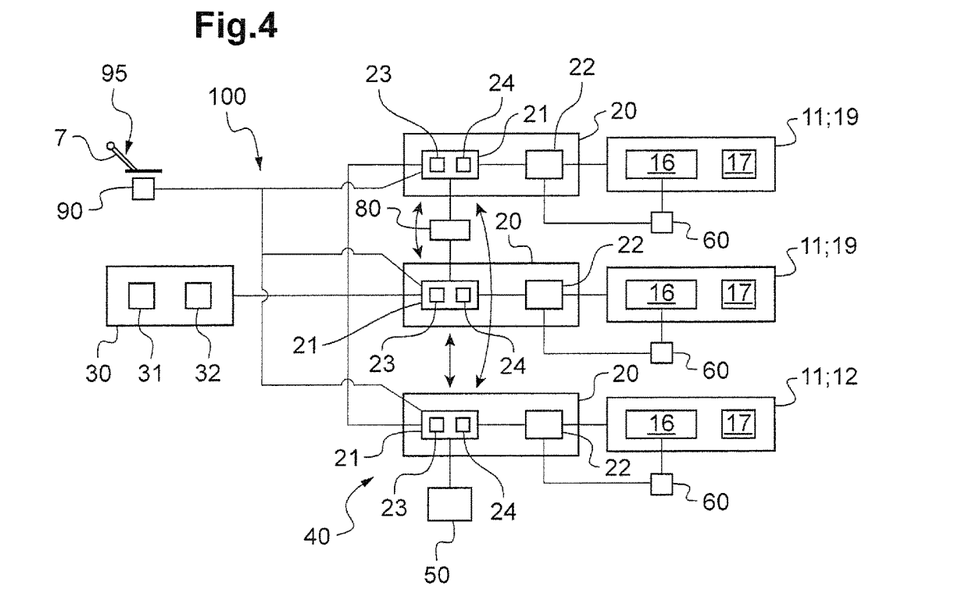
FIG. 4 is a diagram showing a second variant of the invention.

In the variant of FIG. 4, each management system is a part of the processor unit 40.

Figure 5:
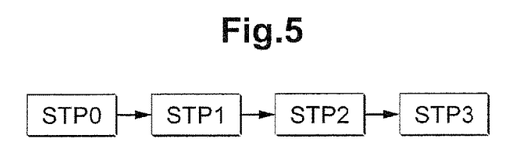
FIG. 5 is a diagram showing the method of the invention.

With reference to FIG. 5, the stop device serves to cause an engine for stopping 12 in flight to stop "gently".

Figure 6:
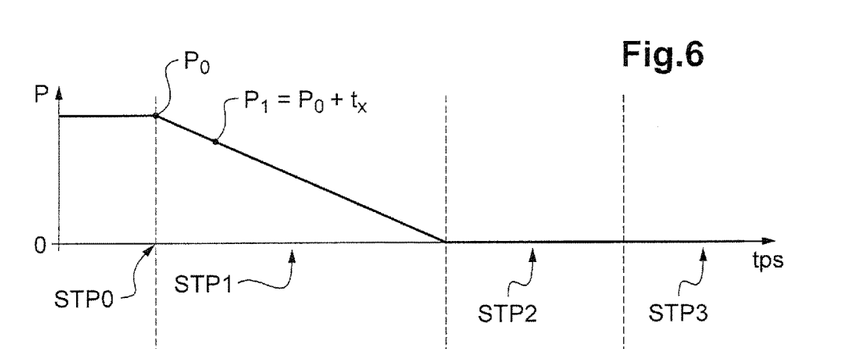
FIGS. 6 to 8 are diagrams explaining the operation of the invention.
Figure 7:
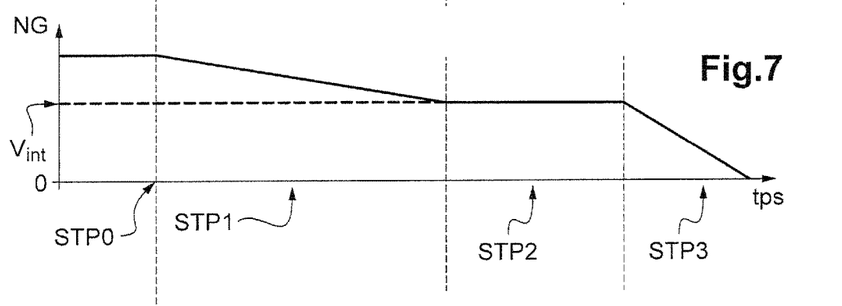
Figure 8:
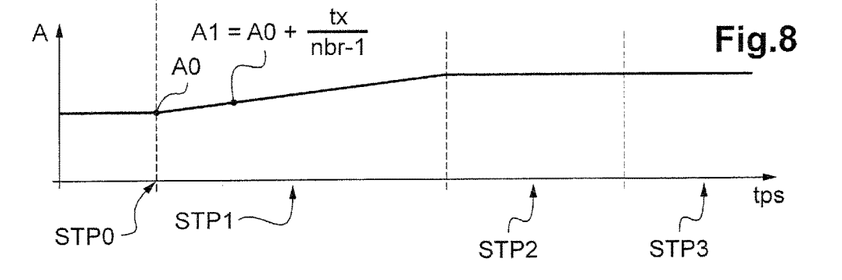

The method is also illustrated by FIGS. 6 to 8.

FIG. 6 is thus a graph plotting the power P developed by the engine for stopping up the ordinate axis, and plotting time along the abscissa axis.

FIG. 7 is a graph plotting the speed of rotation Ng of the gas generator of the engine for stopping up the ordinate axis, and plotting time along the abscissa axis.

FIG. 8 is a graph plotting an anticipation order A as transmitted by the anticipator 90 up the ordinate axis, and plotting time along the abscissa axis.

With reference to FIG. 1, during a step STP0 of generating an order, the control means generate a stop order ordering stopping of an engine referred to as the "engine for stopping" 12.

In the variant of FIG. 3, the stop order is transmitted to the dedicated unit 41 of the processor unit 40.

In the variant of FIG. 4, the stop order is transmitted to a management system of the processor unit, and in particular to the management system of the engine for stopping 12.

Optionally, the engine for stopping is a turboshaft engine having a dynamic air inlet 18 facing towards a front end 2 of the aircraft 1.

In addition, the stop order may optionally be taken into account only if the aircraft 1 is at an altitude higher than an altitude threshold.

If the stop order is taken into consideration, and with reference to FIG. 5, the processor unit 40 automatically performs a power reduction step STP1.

With reference to FIG. 6, during this power reduction step STP1, the processor unit requires the current power being developed by the engine for stopping to be reduced so as to reach zero power.

This current power then decreases as a function of a predetermined variation rate referred to as the "power variation rate tx".

At a given calculation instant, the power P1 is thus equal to the power P0 at the preceding calculating instant minus the power variation rate tx.

By way of example, the power variation rate tx may lie in a narrow range extending from 1 percent to 15 percent of a reference power Pref per second. This range makes it possible to avoid premature shutting down of the engine for stopping, and tends to avoid jolts being generated on the aircraft.

This reference power Pref corresponds to the maximum power in required for takeoff under ISA SL conditions.

In addition, the power variation rate tx may be determined by the processor unit as a function of a stage of flight of the aircraft. The stage of flight may be determined using a speed of advance of the aircraft, for example.

In particular, the power variation rate tx may be determined as a function of at least one of the following parameters: a piloting parameter of the aircraft relating to a parameter controlled by a pilot; a flight parameter relating to the flying conditions of the aircraft 1; an engine parameter relating to the operation of the engine for stopping 12; and information indicating whether the aircraft 1 is carrying passengers.

By way of example, a manufacturer acts during an initialization step to perform multiple tests or simulations in order to determine the parameters that have an impact on the power variation rate to be applied on a given aircraft.

Under such circumstances, and using this initialization step, the manufacturer can determine and store multiple power variation rates tx as a function of at least one of said parameters, or indeed at least one relationship giving such a rate as a function of at least one of said parameters.

The processor unit 40 can then use the measurement system 50 to access the various items of information needed.

With reference to FIG. 7, during this power reduction step STP1, the processor unit also requires the current speed of rotation Ng of the gas generator of the engine to be reduced so that the current speed of rotation reaches a predetermined intermediate speed Vint when said current power becomes zero.

In the variant of FIG. 3, in order to achieve this power reduction step STP1, the dedicated unit 41 of the processor unit 40 communicates with the management system of the engine for stopping in order to supply it with the power variation rate to be applied.

The management system of the engine for stopping deduces therefrom a position setpoint for the fuel metering unit to apply so as to reduce the power developed by the engine for stopping and so as to reduce its speed of rotation Ng in appropriate manner.

In the variant of FIG. 4, the management system of the engine for stopping determines a position setpoint for the fuel metering unit directly, or indirectly by previously calculating the power variation rate that is to be achieved.

Furthermore, and with reference to FIG. 8, the power reduction step STP1 may include an anticipation stage during which the anticipation order A transmitted by the anticipator 90 to each non-stopped engine 11 is increased. This anticipation order A is increased by applying a predetermined variation rate referred to as the "anticipation variation rate tx", which is a function of the power variation rate tx.

For example, the anticipation variation rate tx' is equal to the quotient of the power variation rate tx divided by the given number nbr of engines of the aircraft, minus one.

At a given calculation instant, the anticipation order A1 is thus equal to the anticipation order A0 at the preceding calculation instant plus the power variation rate tx divided by the given number nbr minus one.

In order to perform this anticipation stage and in the variant of FIG. 3, the dedicated unit of the processor unit communicates with the management systems of the engines 18 that are not to be stopped in order to supply them with the power variation rate, for example.

The management systems of these engines 18 that are not to be stopped deduce therefrom a position setpoint to be reached by the corresponding fuel metering unit.

In the variant of FIG. 4, the management system of the engine for stopping acts by way of example to transmit the power variation rate to the management systems of the other engines.

With reference to FIG. 5, during a temperature stabilization step STP2, the current speed of rotation Ng remains equal to the intermediate speed Vint.

Finally, during a shutdown step STP3, the current speed of rotation is reduced to reach a zero speed. The engine for stopping is then completely shutdown.

Optionally, each booster pump 60 of the engine for stopping 12 is turned off when this current speed of rotation of the engine for stopping 12 is zero.

In the variant of FIG. 3, the dedicated unit of the processor unit communicates with the management system of the engine for stopping in order to require closure of the corresponding fuel metering unit or closure of the fuel feed, and then for each appropriate booster pump to be stopped, if any.

In the variant of FIG. 4, the management system of the engine for stopping closes the fuel metering unit directly or closes the fuel feed, and stops each appropriate booster pump, if any.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of stopping a turboshaft engine in flight on a multi-engined aircraft, the turboshaft engine developing a current power at each instant, the turboshaft engine including a gas generator having at least one member presenting, at each instant, rotation at a current speed of rotation, the method comprising a step of generating an order to generate a stop order ordering stopping of the turboshaft engine, the method performing automatically and in succession for the turboshaft engine the following steps when the stop order is generated:
    a power reduction step comprising the stages of:
        reducing the current power at a predetermined power variation rate to reach zero power;
        reducing the current speed of rotation so that the current speed of rotation reaches a non-zero, predetermined intermediate speed when the current power becomes zero;
    a temperature stabilization step during which the current speed of rotation remains equal to the intermediate speed; and
    a shutdown step during which the current speed of rotation is reduced from the intermediate speed to reach zero speed.

2. The method according to claim 1, wherein the aircraft has a given number of turboshaft engines including the turboshaft engine and at least one non-stopped turboshaft engine and the aircraft has an anticipator generating a power anticipation order for controlling the turboshaft engines as a function of a piloting order transmitted to a control member controlling a path followed by the aircraft, the power reduction step including an anticipation stage during which the anticipation order transmitted to each non-stopped turboshaft engine is increased by applying a predetermined anticipation variation rate, which is a function of the power variation rate.

3. A method of stopping a turboshaft engine in flight on a multi-engined aircraft, the turboshaft engine developing a current power at each instant, the turboshaft engine including a gas generator having at least one member presenting, at each instant, rotation at a current speed of rotation, the method comprising a step of generating an order to generate a stop order ordering stopping of the turboshaft engine, the method performing automatically and in succession for the turboshaft engine the following steps when the stop order is generated:
    a power reduction step comprising the stages of:
        reducing the current power at a predetermined power variation rate to reach zero power;
        reducing the current speed of rotation so that the current speed of rotation reaches a predetermined intermediate speed when the current power becomes zero;
    a temperature stabilization step during which the current speed of rotation remains equal to the intermediate speed; and
    a shutdown step during which the current speed of rotation is reduced from the intermediate speed to reach zero speed;
    wherein the aircraft has a given number of turboshaft engines including the turboshaft engine and at least one non-stopped turboshaft engine and the aircraft has an anticipator generating a power anticipation order for controlling the turboshaft engines as a function of a piloting order transmitted to a control member controlling a path followed by the aircraft, the power reduction step including an anticipation stage during which the anticipation order transmitted to each non-stopped turboshaft engine is increased by applying a predetermined anticipation variation rate, which is a function of the power variation rate;
    wherein the anticipation variation rate is equal to the quotient of the power variation rate divided by a difference of the given number of turboshaft engines and one.

4. The method according to claim 1, wherein the power variation rate lies in a range of 1 percent to 15 percent of a reference power per second.

5. The method according to claim 4, wherein the reference power corresponds to the current power developed by the turboshaft engine when the stop order is given.

6. The method according to claim 1, wherein the power variation rate is determined as a function of a stage of flight of the aircraft.

7. The method according to claim 1, wherein the power variation rate is determined as a function of at least one of the following parameters: a piloting parameter of the aircraft relating to a parameter controlled by a pilot; a flight parameter relating to flight conditions of the aircraft; an engine parameter relating to an operation of the turboshaft engine; and information indicating whether the aircraft is carrying passengers.

8. The method according to claim 7, wherein each piloting parameter is to be selected from a list, the list comprising at least: information about a collective pitch of blades of a lift rotor of the aircraft; and information relating to a pitch of blades of a yaw movement control rotor of the aircraft.

9. The method according to claim 7, wherein each flight parameter is to be selected from a list, the list comprising at least: a speed of the aircraft; an altitude of the aircraft; a temperature outside the aircraft; a speed of a lift rotor of the aircraft; and a weight of the aircraft.

10. The method according to claim 7, wherein each engine parameter is to be selected from a list, the list comprising at least: a temperature of the turboshaft engine; a torque of the turboshaft engine; and the current speed of rotation of the gas generator of the turboshaft engine.

11. The method according to claim 1, wherein at least one booster pump of the turboshaft engine is switched off when the current speed of rotation of the turboshaft engine is zero.

12. The method according to claim 1, wherein the turboshaft engine is provided with a dynamic air inlet facing towards a front end of the aircraft.

13. The method according to claim 1, wherein the stop order is considered only if the aircraft is flying at an altitude greater than an altitude threshold.

14. A stop device for stopping a turboshaft engine in flight on a multi-engined aircraft, the turboshaft engine developing a current power at each instant, the turboshaft engine including a gas generator having at least one member presenting, at each instant, rotation at a current speed of rotation, the stop device comprising:
control means for requesting stopping of the turboshaft engine; and
a processor unit configured to perform automatically and in succession for the turboshaft engine in response a request for stopping of the turboshaft engine from the control means:
 a power reduction stage during which (i) the current power is reduced at a predetermined power variation rate to reach zero power and (ii) the current speed of rotation is reduced so that the current speed of rotation reaches a non-zero, predetermined intermediate speed when the current power becomes zero;
 a temperature stabilization stage during which the current speed of rotation is maintained equal to the intermediate speed; and
 a shutdown stage during which the current speed of rotation is reduced from the intermediate speed to reach zero speed.

* * * * *